(12) United States Patent
Hermann

(10) Patent No.: US 7,790,027 B2
(45) Date of Patent: Sep. 7, 2010

(54) MEMBRANE PLATE FOR A FILTER PRESS

(75) Inventor: Manfred Hermann, Nürnberg (DE)

(73) Assignee: JVK Filtration Systems GmbH, Georgensgmünd (DE)

( * ) Notice: Subject to any disclaimer, the term of this patent is extended or adjusted under 35 U.S.C. 154(b) by 252 days.

(21) Appl. No.: 11/923,689

(22) Filed: Oct. 25, 2007

(65) Prior Publication Data
US 2008/0093286 A1    Apr. 24, 2008

Related U.S. Application Data

(63) Continuation of application No. PCT/EP2006/003616, filed on Apr. 20, 2006.

(30) Foreign Application Priority Data
Apr. 25, 2005    (DE) ............... 20 2005 006 681 U

(51) Int. Cl.
B01D 25/168    (2006.01)
B01D 25/12    (2006.01)
B01D 25/164    (2006.01)
B01D 25/00    (2006.01)

(52) U.S. Cl. ............... 210/228; 210/224; 210/227; 210/231

(58) Field of Classification Search ............... 210/224, 210/227, 228, 231
See application file for complete search history.

(56) References Cited

U.S. PATENT DOCUMENTS 3,289,845 A * 12/1966 Weber ............... 210/231
3,926,811 A * 12/1975 Ramsteck ............... 210/231
6,919,024 B1 * 7/2005 Claessen ............... 210/229

FOREIGN PATENT DOCUMENTS

FR    2623420 A1    5/1989
WO    WO 01/37962    *    5/2001

* cited by examiner

Primary Examiner—Krishnan S Menon
Assistant Examiner—Benjamin Kurtz
(74) Attorney, Agent, or Firm—Laurence A. Greenberg; Werner H. Stemer; Ralph E. Locher

(57) ABSTRACT

A membrane filter plate for a filter press includes a membrane fastened in the filter plate. The membrane has a flexible support layer, a central region with a functional layer different from the flexible support layer, and edge regions free of the functional layer.

8 Claims, 2 Drawing Sheets

MEMBRANE PLATE FOR A FILTER PRESS

CROSS-REFERENCE TO RELATED APPLICATIONS

This is a continuation, under 35 U.S.C. §120, of copending International Application No. PCT/EP2006/003616, filed Apr. 20, 2006, which designated the United States; this application also claims the priority, under 35 U.S.C. §119, of German Patent Application No. DE 20 2005 006 681.8, filed Apr. 25, 2005; the prior applications are herewith incorporated by reference in their entirety.

BACKGROUND OF THE INVENTION

Field of the Invention

The invention relates to a membrane plate for a chamber filter press. Such chamber filter presses have filter chambers formed by placing two filter plates side by side. The filter plates have a plate edge that is much thicker than a plate body. Adjacent filter plates rest against one another on the plate edges and form a filter chamber within the edges due the plate body receding relative to the plate edges. After the substance to be pressed has been pressed out, a liquid filtrate is fed in a known manner through discharge boreholes in the filter plate. A pressed-out filter cake remains in the filter chamber. The filter cake is removed by separating the two filter plates that form the filter chamber, so that their edge regions no longer rest against one another. The membrane which is applied to at least one filter plate that forms the filter chamber is placed in vibration, causing it to eject the filter cake.

Exchangeable membranes are fastened in a form-locking manner to the plate body in the region of the plate edge, through a tongue-and-groove connection. A form-locking connection is one which connects two elements together due to the shape of the elements themselves, as opposed to a force-locking connection, which locks the elements together by force external to the elements. Taking into account manufacturing tolerances and shrinkage caused during manufacture and within the filter press during compression processes as a result of high thermal expansion coefficient of thermoplastic plastics and/or elastomers, the membrane must have sufficient flexibility to allow it to be attached to the filter plate without problems. For many applications, however, that flexibility requirement is in contradiction to the requirement that the membrane be manufactured from a hard thermoplastic. Hard thermoplastics are usually used in cases involving high temperatures, high filtration pressures, high compression pressures and high chemical stresses on the filter plate and its membrane.

French Patent Application FR 2 623 420 A describes a membrane filter plate for a filter press with a membrane that is fastened in a multiple-layer filter plate. The membrane includes a flexible support layer and a functional layer, which can be made of a different material than the support layer.

U.S. Pat. No. 3,289,845 describes filter presses with membrane filter plates, which are also made up of multiple different layers.

BRIEF SUMMARY OF THE INVENTION

It is accordingly an object of the invention to provide a membrane plate for a filter press, which overcomes the hereinafore-mentioned disadvantages of the heretofore-known devices of this general type in such a way that a hard and inflexible membrane can also be easily mounted on the filter plate.

With the foregoing and other objects in view there is provided, in accordance with the invention, a membrane filter plate for a filter press. The membrane filter plate comprises a membrane fastened in the filter plate. The membrane has a flexible support layer, a central region with a functional layer different from the flexible support layer, and edge regions free of or separated from the functional layer.

Therefore, in order to attain the object of the invention, a membrane with a sandwich-type configuration is provided. The membrane includes a thick and flexible support layer and a thin functional layer that is applied to the support layer. The functional layer is made of a hard, stable material, which is easily able to withstand high temperatures, high pressures or high chemical stresses. In one advantageous embodiment, the support layer can be 3 to 4 mm thick, whereas the functional layer is only 0.5 mm thick.

In accordance with another feature of the invention, stretching and stress can be absorbed equally by the flexible support layer. The functional layer need not transfer any forces. It can be limited to its protective function. The functional layer and the support layer can be connected to one another, for example by welding. It is also possible to spray the functional layer onto a suitable support layer.

In accordance with a further feature of the invention, it is advantageous for the edge regions of the membrane to be manufactured exclusively from the support material of the support layer, and for the functional layer to be concentrated at the plate center that is stressed during compression.

In accordance with an added feature of the invention, the functional layer is made of a hard thermoplastic, or a temperature resistant material, or a highly stable material, or a highly chemically resistant material.

In accordance with a concomitant feature of the invention, there are provided molded projecting elements form-lockingly connecting the membrane to the filter plate with a tongue-and-groove connection.

Other features which are considered as characteristic for the invention are set forth in the appended claims.

Although the invention is illustrated and described herein as embodied in a membrane plate for a filter press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
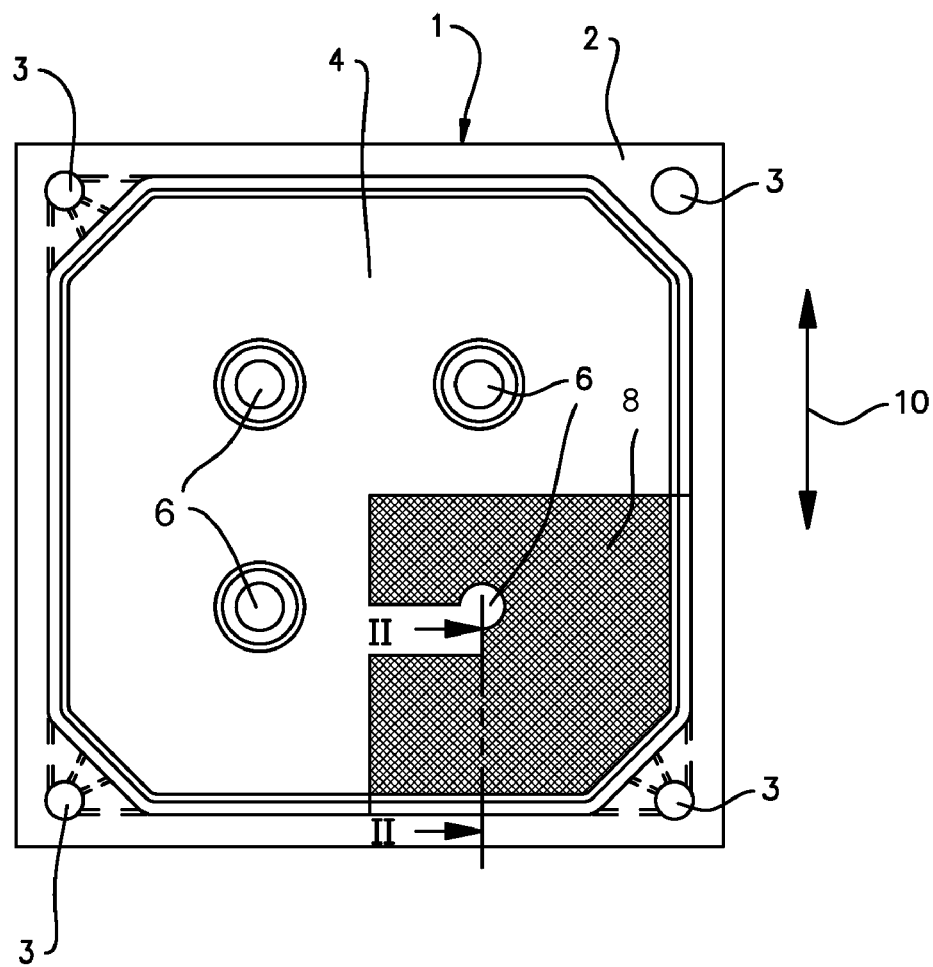
FIG. 1 is a diagrammatic, plan view of a chamber side of a filter plate according to the invention, with a partial illustration of a membrane.

Referring now to the figures of the drawings in detail and first, particularly, to FIG. 1 thereof, there is seen a filter plate 1 have a surrounding plate edge 2, in which filtrate boreholes 3 are provided. The plate edge 2 that surrounds the filter plate 1 forms a border around a chamber tray or base 4 formed by the plate surface. The plate edge 2 projects outward from the chamber tray 4 in a crosswise or transverse direction 5 of the plate, which is clearly recognizable in FIG. 2. The thickness of the plate edge 2 in the crosswise direction 5 of the plate is consequently much greater than the thickness of the chamber tray 4, as measured in the crosswise direction 5 of the plate. Support cams 6 also project outward from the chamber tray 4 in the crosswise direction 5 of the plate. The support cams 6 serve to support the chamber tray 4 against corresponding support cams of an opposite chamber tray of an adjacent filter plate. In this manner, a warping of the chamber tray 4 during a filter process in the filter press is prevented.

In the exemplary embodiment, a membrane 8, which is only partially shown in FIG. 1, is fastened in mounting grooves both on the plate edge 2 and on the support cam 6, using molded projecting elements 7. The molded projecting elements 7 in this case are tongues of a tongue-and-groove combination, with which the membrane plate 8 is form-lockingly connected to the filter plate 1.

Figure 2:
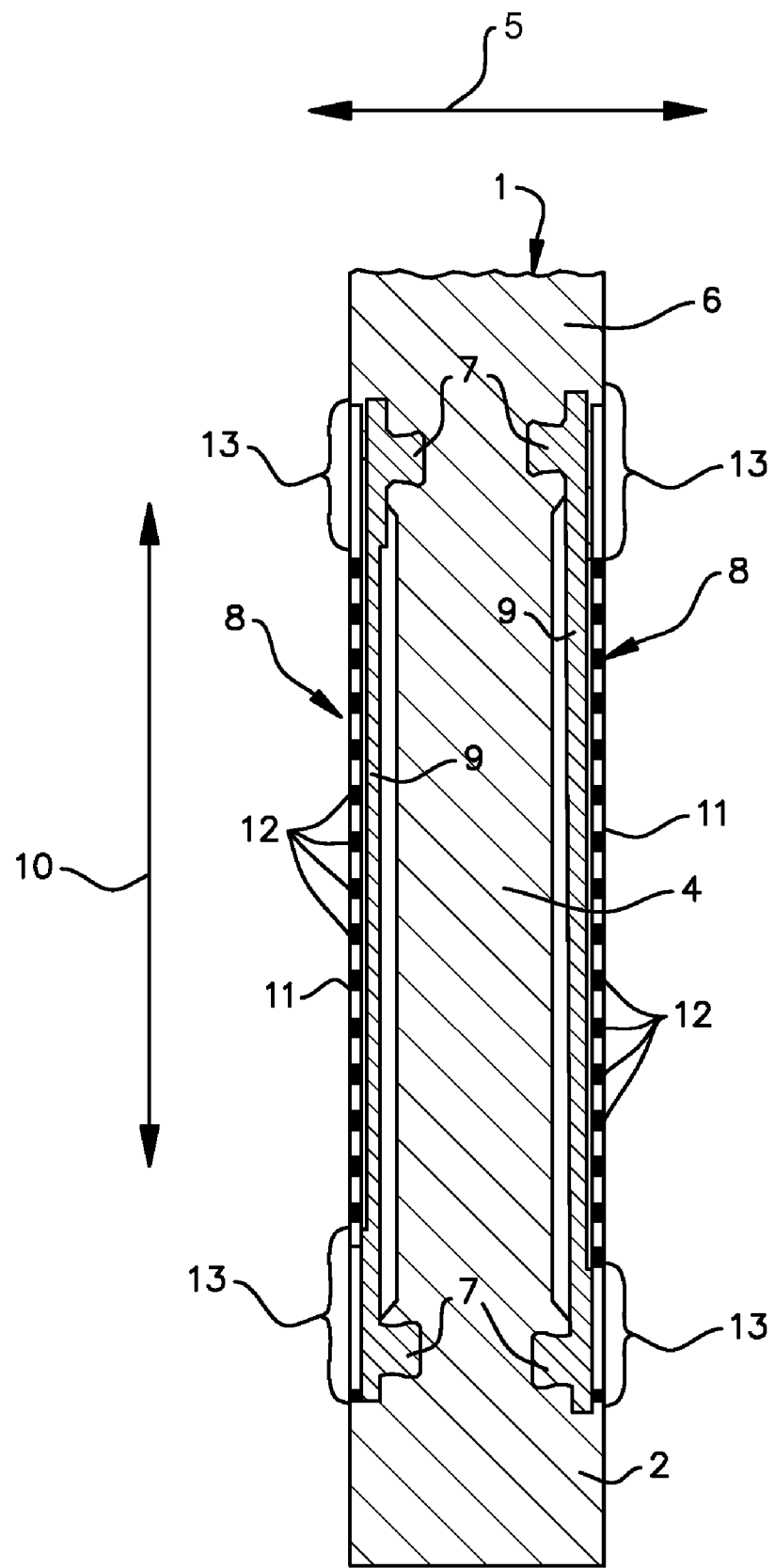
FIG. 2 is an enlarged, fragmentary, cross-sectional view taken along a line II-II of FIG. 1.

The membrane 8 has a flexible support layer 9 shown in FIG. 2. The flexible support layer 9 extends over the entire length of the membrane 8 in a longitudinal plate direction 10 that extends perpendicular to the crosswise plate direction 5. In a central region of the membrane, a thermally and chemically stable functional layer 11, which is shown in black in FIG. 2, is applied to the support layer 9. In this case the functional layer 11 carries profiling in the form of knobs or napping 12 as a drainage element. The functional layer 11 is positioned at the center of the membrane 8 in such a way that edge regions 13 of the membrane 8 are separated from or free of the functional layer 11 and/or a coating that forms the functional layer 11. The edge regions 13, that exclusively include the flexible support layer 9, facilitate the fastening of the membrane 8 to the filter plate 1 and also improve the flexibility of the membrane 8 during operation of the filter plate 1.

The filter plate 1 according to the invention can be more easily manufactured through the use of the invention. Shrinkage tolerances that occur during manufacturing can be compensated for due to the increased flexibility of the membrane 8. In particular, material shrinkage during manufacturing is time-dependent. It must also be taken into account that the membrane is exposed to a certain amount of shrinkage during the pressing operation. Finally, assembly is facilitated. A compensation for tolerances is achieved in advance due to the improved flexibility of the membrane 8.

The invention claimed is:

1. A membrane filter plate for a filter press, the membrane filter plate comprising:

mutually perpendicular crosswise and longitudinal plate directions;

a membrane fastened in the filter plate and having a length;

said membrane having a flexible support layer extending entirely over said length of said membrane in said longitudinal plate direction;

said membrane having a central region with a functional layer formed of a hard, resistant material, said functional layer being different from and applied to said flexible support layer; and said membrane having edge regions free of said functional layer.

2. The filter plate according to claim 1, wherein said functional layer is made of a hard thermoplastic.

3. The filter plate according to claim 1, wherein said functional layer is made of a temperature resistant material.

4. The filter plate according to claim 1, wherein said functional layer is made of a highly stable material.

5. The filter plate according to claim 1, wherein said functional layer is made of a highly chemically resistant material.

6. The filter plate according to claim 1, wherein said functional layer is welded to said support layer.

7. The filter plate according to claim 1, which further comprises molded projecting elements form-lockingly connecting said membrane to the filter plate with a tongue-and-groove connection.

8. The filter plate according to claim 1, wherein said functional layer is thinner than said support layer.

* * * * *